H. R. Worthington,
Steam-Boiler Water-Feeder,
№ 66. Reissued Sep. 7. 1844.
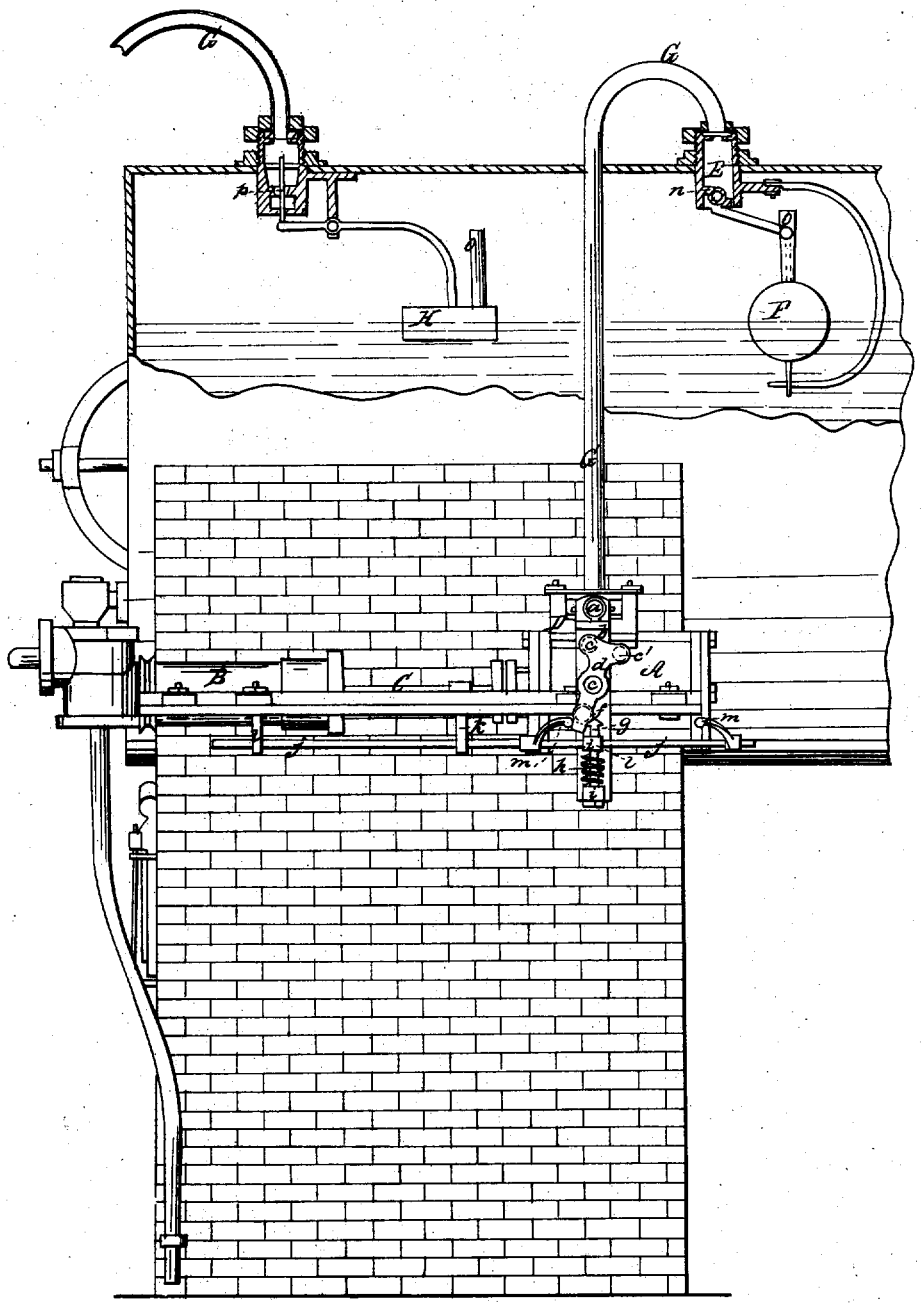
M. PHOTO-LITHO. CO. N.Y. (OSBORNE'S PROCESS.)

UNITED STATES PATENT OFFICE.

HENRY R. WORTHINGTON, OF BROOKLYN, N. Y.

IMPROVEMENT IN THE MANNER OF CONSTRUCTING AND GOVERNING AN AUXILIARY STEAM-ENGINE FOR THE PURPOSE OF SUPPLYING A STEAM-BOILER WITH WATER.

Specification forming part of Letters Patent No. 3,677, dated July 24, 1844; Reissue No. 66, dated September 7, 1844.

*To all whom it may concern:*

Be it known that I, HENRY R. WORTHINGTON, of the city of Brooklyn, in the State of New York, have made certain new and useful improvements in the manner of constructing and governing an auxiliary steam-engine for the purpose of supplying a steam-boiler with water; and I do hereby declare that the following is a full and exact description thereof.

In the accompanying drawing I have represented my auxiliary engine and a force-pump connected therewith. I have also shown a part of a steam-boiler, which has a portion of its cylindrical shell removed for the purpose of exhibiting the manner in which I construct and arrange a float and valve for the supplying of steam to work the auxiliary engine.

In the general arrangement of my auxiliary engine and pump there is nothing new, such engines and pumps having been in use prior to the invention by me of the improvements therein which I am about to describe.

A is the steam-cylinder of the auxiliary engine, and B the cylinder of the force-pump. The steam-cylinder is furnished with a slide-valve, steam ports or openings, a piston, piston-rod, and other appendages ordinarily used.

C is the piston-rod, the extension of which into the force-pump constitutes the plunger of that part of the apparatus.

My improvement in the auxiliary engine consists in the manner of rendering the action of the slide-valve certain, without its being necessary to depend upon the momentum of the engine therefor. The movement of this valve has ordinarily been produced by attaching a projecting pin to the piston-rod or to a rod connected therewith, which pin was at the proper time made to strike a lever on the valve-stem, and thereby move the slide in the proper direction for the alternate admission of steam on the opposite sides of the piston. When the engine is thus arranged, the momentum of the moving parts is depended on for continuing the motion of the valve beyond the steam ports or openings; but it has been found in practice with all engines of this description that the momentum is frequently insufficient for this purpose. The motion is often extremely slow, as when the water is nearly at the required height in the boiler the quantity of steam that passes to the auxiliary engine is very small, and the valve is then liable to stop in such a position as to cover both of the steam ports or openings into the cylinder. By my improvement the danger of the stopping of the valve in such a position as to prevent the motion of the engine is obviated.

The principle upon which my improvement is dependent may be carried into effect in various ways; but I have in the accompanying drawing represented that which after careful experiment I have found to be simple and perfectly effective.

D is the steam-chest of my auxiliary engine, within which there is a slide-valve of the ordinary construction, the seat of which is curved, as is usual where the valve is moved by the vibration of its stem, this being so moved by its stem *a*. To this stem I attach an arm or lever, *b*, which extends down and passes between two projecting pins, the places of which are shown by the dotted lines *c c'* on the head of the T-formed piece *d*, which piece vibrates on a center at *e*. Toward the lower end of this piece, as at *f*, there is a friction-roller, against which a sliding piece, *g*, is borne up by a spiral or other spring, *h*. The piece *g* is guided up and down by passing through holes in the studs *i i*, or in any other convenient manner. Its head is in the form represented in the drawing, where it is shown as forming two inclined planes meeting in an angular point at its apex. A sliding rod, *j j*, which is attached to the piston-rod by an arm, *k*, and passes through sockets at *i l l*, carries two tappets, *m m*, which operate upon the lower end of the vibrating piece *d*. The pins *c c'*, which receive between them the lower end of the arm or lever *b*, are so far apart as to allow said lever to vibrate to a considerable distance out of contact with either of them. Under this arrangement it will be seen that when the engine is in motion the tappets *m m*, being alternately brought into contact with the vibrating piece *d*, will move it back and forth, alternately depressing and relaxing the spring *h*, but that the vibration will not, in consequence of the distance apart of the pins *c c'*, communicate motion to the slide-valve until the friction-roller *f* has passed over the apex of the sliding piece *g*, when the spring *h*, by its tension, will then force up said piece and give the required motion to the slide-valve, and it will thus be moved back and forth with unerring certainty, it being impossible for the valve to remain over both steam-ports.

It may be observed that the peculiar form of steam-valve above referred to is not essential to the arrangement, as by a slight modification the requisite motion may be produced on a slide-valve moving upon a plane surface and drawn by a stem in the ordinary manner; also, it may be seen that by changing the direction of the passages for the steam in such manner as that the forward opening may communicate with the back end of the cylinder, and vice versa, a disposition of the moving parts may be made having the advantage of greater simplicity, inasmuch as part of the arrangement described above is calculated to produce the contrary motion of the valve necessary when the passages lead in the ordinary way.

In order to render the auxiliary engine self-regulating, without requiring attention on the part of the engineer, I place a float within the boiler which as the water descends below its ordinary level will, through the intervention of a lever, act upon a valve and open it to such extent as is necessary to regulate the quantity of steam passing through it, which will be proportioned to the deficiency of water in the boiler.

I have in the accompanying drawing shown two different modes of arranging the float and valve, either of which will answer the purpose.

Having thus fully described the nature of my invention, and shown the manner in which the same may be carried into operation, what I claim as new therein, and desire to secure by Letters Patent, is--

The employment of a spring in combination with the steam-valve of an auxiliary engine, for supplying a boiler with water, so arranged, substantially as herein described, as to admit of its being properly armed or compressed by the action of the engine upon an intermediate piece or lever while the steam-valve remains at rest until at the proper time by the further motion of the engine the spring is released and acts to draw said valve independently of the momentum of the engine, in the manner and for the purposes above fully set forth.

HENRY R. WORTHINGTON.

Witnesses:

ASA WORTHINGTON,

J. W. CARRINGTON.